United States Patent [19]

Marks

[11] Patent Number: 4,602,856
[45] Date of Patent: Jul. 29, 1986

[54] COMBINED PHOTOPIC AND SCOTOPIC VIEWERS FOR TWO-DIMENSIONAL MOVING IMAGE DISPLAYS

[76] Inventor: Mortimer M. Marks, 166-25 Cryders La., Beechhurst, N.Y. 11357

[21] Appl. No.: 579,866

[22] Filed: Feb. 13, 1984

[51] Int. Cl.$^4$ .......................... G02C 7/10; G02C 7/16
[52] U.S. Cl. ......................................... 351/44; 351/45
[58] Field of Search ..................... 351/44, 45; 350/144

[56] References Cited

U.S. PATENT DOCUMENTS

| | | | |
|---|---|---|---|
| 2,139,275 | 12/1938 | Lee ......................................... | 351/45 |
| 3,445,153 | 5/1969 | Marks et al. ......................... | 350/144 |
| 3,591,263 | 7/1971 | Esterson ................................ | 351/44 |

Primary Examiner—Rodney B. Bovernick
Attorney, Agent, or Firm—Albert F. Kronman

[57] ABSTRACT

A viewer for producing the illusion of three-dimensional images from two-dimensional moving image displays which includes a spectacle-like support having a frame and lateral bows on the frame for engagement with the ears of the user. The frame is made of opaque material in which a rectangular opening is provided for each eye of the user. Forwardly extending, tubular light shields are carried by the frame around each rectangular opening. Band pass light filter within the rectangular openings permit one eye to see only with cone vision the other eye only with rod vision.

6 Claims, 3 Drawing Figures

COMBINED PHOTOPIC AND SCOTOPIC VIEWERS FOR TWO-DIMENSIONAL MOVING IMAGE DISPLAYS

FIELD OF THE INVENTION

This invention relates to viewers for 3-dimensional pictures and, in particular, to a viewer for creating the illusion of 3-dimensional images from conventional flat motion picture or television displays.

BACKGROUND OF THE INVENTION

This invention constitutes an improvement over the system disclosed and claimed in U.S. Pat. No. 3,445,153 issued May 20, 1969 and which is incorporated herein by reference.

As disclosed in the above patent, if there is a displacement of the image pairs produced in the eyes proportional to the image velocity on a screen, a 3-dimensional viewing effect is obtained. This displacement can be obtained by using two different filters which respectively induce photopic (cone vision) in one eye and scotopic (rod) vision in the other eye. The filters, known as "P and S" filters, cause a spectral shift between the visual sensitivity curves of scotopic and photopic vision known as the Parkinje shift. However, viewers incorporating this principle have not been practical because the effect obtained has been greatly degraded owing to the fact that unfiltered light from ambient sources often reaches the eyes of the users, thereby stimulating rods where only cone vision is desired and cones where only rod vision is desired.

Accordingly, it is an object of the present invention to provide a 3-dimensional viewer employing photopic and scotopic principles which maximizes the 3-dimensional effect, Another object of this invention is to provide an inexpensive, improved 3-dimensional viewing frame of optimum design which will keep unfiltered ambient light from reaching the user's eyes and thereby intensify the preceived image.

A further object of the present invention is to restrict the viewing area of the spectacle to improve the observed image.

DETAILED DISCLOSURE

Figure 1:
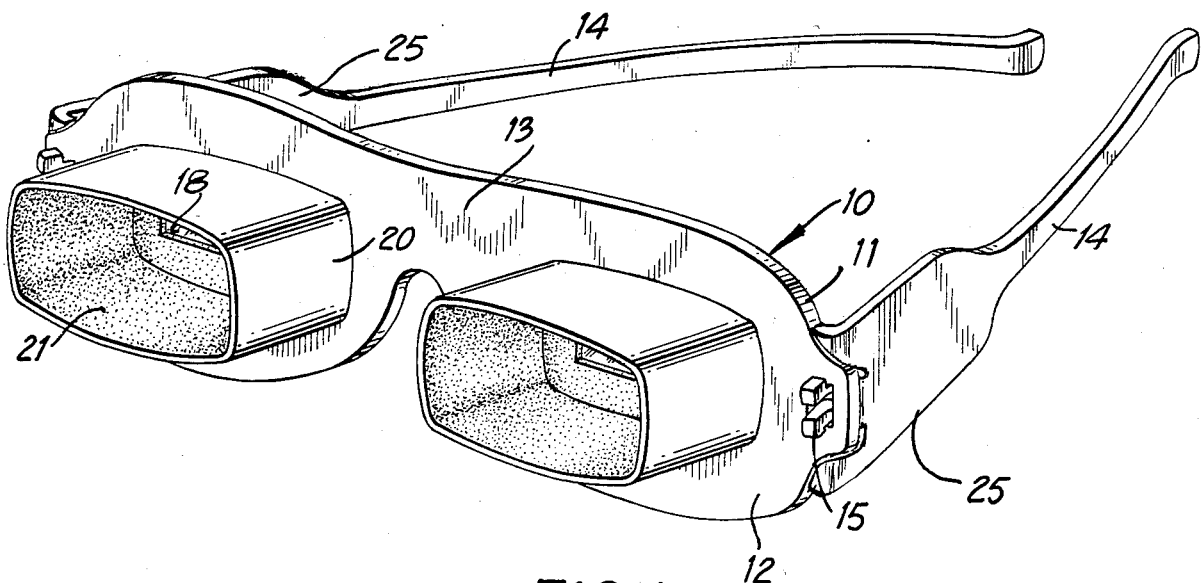
FIG. 1 is a perspective view of one complete embodiment of a viewer in accordance with the invention.
Figure 2:
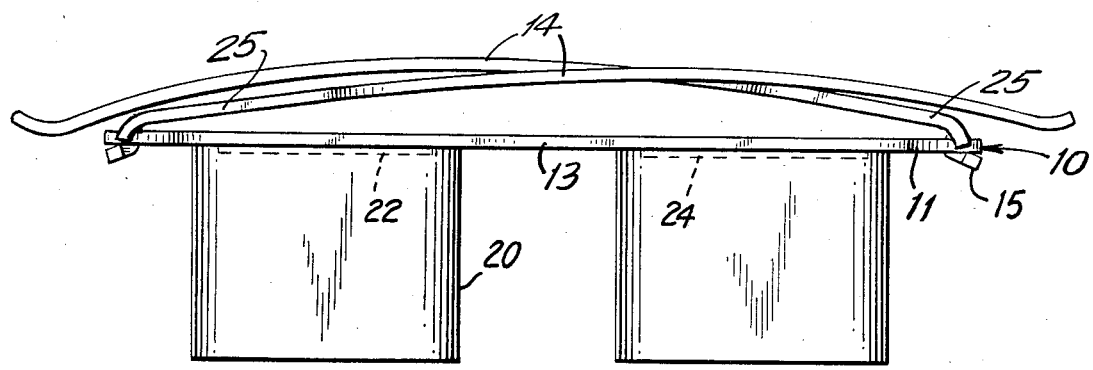
FIG. 2, is a top plan view of the viewer of FIG. 1.

Referring to the drawing, the viewer of the invention is designated generally by reference character 10 and comprises a frame such as a spectacle frame 11 having a front face 12, a bridge 13 and a pair of bows 14 secured at each side of the frame. The bows 14 are secured to the frame by suitable means such as hinges or other mechanical couplings 15 to allow folding and unfolding of the bows 14 as shown in FIGS. 1 and 2. The frame can assume any desired shape and may be molded or otherwise made of any suitable opaque material such as plastic, paperboard, or metal.

A pair of spaced rectangular slits 18 are provided in the front face 12 of the frame 11. By reducing the area viewed through the face, there is an intensification of the image perceived by the user's eyes which also contributes to the illusion of three-dimensional viewing.

A generally rectangular or elliptical, tubular mask 20 is secured to and extends from the outside surface 19 of front of the frame around each of the rectangular slits 18. These masks have dark, light absorbing coatings. It is preferred to have a roughened texture on the inner surface 21 of the masks to absorb as much lateral ambient light as possible.

Figure 3:
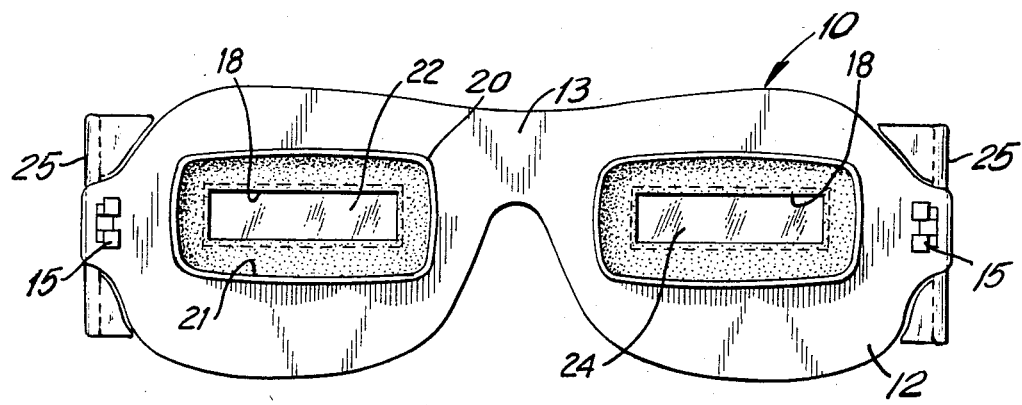
FIG. 3 is a front elevational view of the viewer of FIGS. 1 and 2.

A band pass light filter is carried within each slit 18 to promote photopic and scotopic viewing. The first filter, indicated at 22 in FIG. 3, permits only scotopic vision in the eye behind it. This filter transmits a small proportion of blue light in the region of 400 to 475 nm and a greater proportion of red light beyond 600 nm in combination with a neutral filter having transmittance of the order of 75%.

Similarly carried by the other slit 18 is a second filter 24 (FIG. 3) which permits only photopic vision in the other eye and has band pass characteristics with a peak of 50 to 85% at about 560 nm and at 70% of peak having a width of between 480 mn to 730 nm.

Further details concerning these filters are given in U.S. Pat. No. 3,445,153. Preferred filters for producing photopic filters are a yellow-green filter comprising a dye in solid solution with a polymer. A preferred filter for producing scotopic vision is a magenta-neutral transmittance filter.

In a practical embodiment of the present invention, the slits 18 were 5/16 inch wide and 1¼ inches long and the masks 22 were 1¼ inches deep and 1¾ inches across.

The design of the masks 22 should be such that light reflected from the filters is not redirected toward the user's eye and to this end the masks may be formed with sides diverging slightly from the front of the frame.

As a further means for protecting each eye of the viewer fron nonfiltered light, the bows 14 are made with enlarged opaque shield portions 25 (best shown in FIG. 1).

Having thus fully described the invention, what is claimed is:

1. A viewer for producing an illusion of three-dimensional images from moving two-dimensional images, comprising a frame including a front face and a pair of bows hinged thereto for securing said frame to the head of a user; a pair of spaced, substantially rectangular slits in said front face of said frame disposed in front of the eyes of a user; tubular, light-absorbing, dark, masks around said slits on said front part extending forward of the viewer; a first band pass light filter within one of said slits, said first filter transmitting a small proportion of blue light in the region 400 to 475 nm and a greater proportion of red light beyond 6700 nm in combination with a neutral filter having a transmittance of the order of 75%, said filter permitting only a scotopic vision in one eye and a second band pass light filter in the other slit, said second filter having band pass characteristics with a peak of 50% to 85% at about 50 nm and at 70% of peak having a width of between 410 nm and 730 nm, permitting only photopic vision in the other eye.

2. The viewer of claim 1, wherein said masks have a textured, light-absorbing, dark coating on their inner surfaces to absorb lateral excess ambient light falling thereon.

3. The viewer of claim 1, wherein said first filter is a yellow-green filter comprising a dye in solid solution with a polymer.

4. The viewer of claim 1, wherein said second filter is a magenta-neutral transmittance filter.

5. The viewer of claim 1, wherein said masks are substantially rectangular in section and diverge outwardly from the front part of the viewer.

6. The viewer of claim 1, wherein said masks are generally elliptical in section.

* * * * *